US010901422B2

(12) United States Patent
Bae et al.

(10) Patent No.: US 10,901,422 B2
(45) Date of Patent: Jan. 26, 2021

(54) USING POSITION ESTIMATE ERROR BOUNDS FOR SAFE VEHICLE NAVIGATION

(71) Applicant: Faraday & Future Inc., Gardena, CA (US)

(72) Inventors: Hong S. Bae, Torrance, CA (US); Aziz Umit Batur, Torrance, CA (US); Evan Roger Fischer, Torrance, CA (US); Oliver Max Jeromin, Torrance, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/610,415

(22) Filed: May 31, 2017

(65) Prior Publication Data

US 2018/0292832 A1 Oct. 11, 2018

Related U.S. Application Data

(60) Provisional application No. 62/343,763, filed on May 31, 2016.

(51) Int. Cl.
| G05D 1/02 | (2006.01) |
| G05D 1/00 | (2006.01) |
| B60W 30/00 | (2006.01) |
| G08G 1/00 | (2006.01) |

(52) U.S. Cl.
CPC ........... *G05D 1/0214* (2013.01); *B60W 30/00* (2013.01); *G05D 1/0088* (2013.01); *G05D 1/0274* (2013.01); *G08G 1/00* (2013.01); *G05D 2201/0213* (2013.01)

(58) Field of Classification Search
CPC .. G05D 1/0214; G05D 1/0274; G05D 1/0088; G05D 2201/0213; B60W 30/00; G08G 1/00
See application file for complete search history.

(56) References Cited

U.S. PATENT DOCUMENTS

| 2007/0192013 | A1* | 8/2007 | Bando | ...................... B60T 7/22 701/93 |
| 2008/0312814 | A1* | 12/2008 | Broadbent | ......... G01C 21/3611 701/532 |
| 2015/0362322 | A1* | 12/2015 | Ozaki | .................... G01C 21/30 701/468 |
| 2017/0307383 | A1* | 10/2017 | Kubo | .................... G01C 21/26 |

* cited by examiner

*Primary Examiner* — Mary Cheung
(74) *Attorney, Agent, or Firm* — Veros Legal Solutions, LLP

(57) ABSTRACT

A system that performs a method is disclosed. The system receives information about a map, which includes information about one or more zones in the map. While navigating a vehicle along a driving path within the map, the system receives information about the location of the vehicle in the map. The system estimates an error bounds of the location of the vehicle, and determines in which of the one or more zones in the map the error bounds is located within. In response to the determination: in accordance with a determination that the error bounds is located within a first zone in the map, the system causes the vehicle to perform a driving operation. In accordance with a determination that the error bounds is located within a second zone of the one or more zones in the map, the system causes the vehicle to perform a different driving operation.

20 Claims, 3 Drawing Sheets

USING POSITION ESTIMATE ERROR BOUNDS FOR SAFE VEHICLE NAVIGATION

CROSS-REFERENCE TO RELATED APPLICATIONS

This application claims the benefit of U.S. Provisional Application No. 62/343,763, filed May 31, 2016, the entirety of which is hereby incorporated by reference.

FIELD OF THE DISCLOSURE

This relates generally to using confidence level (e.g., error bounds) of a vehicle's estimated location and a zoned map for vehicle navigation.

BACKGROUND OF THE DISCLOSURE

Modern vehicles, especially automobiles, increasingly use systems and sensors for detecting and gathering information about the vehicle's location. Autonomous vehicles can use such information for performing autonomous driving operations. However, the vehicle's exact position and orientation may not always be determined with 100% certainty. Therefore, an alternative solution to use the vehicle's estimated location and a zoned map for safe vehicle navigation is desirable.

SUMMARY OF THE DISCLOSURE

Examples of the disclosure are directed to using confidence level (e.g., error bounds) of a vehicle's estimated location and a zoned map for safe autonomous driving navigation. The vehicle can use an error bounds, a map, and zones for safe navigation. The vehicle can use its estimated location error bounds to stay within a safe zone of a map by detecting when the error bounds enter into different zones of a map. In this way, the vehicle can safely navigate within a map even without being able to determine the vehicle's location with absolute certainty.

DETAILED DESCRIPTION

In the following description of examples, references are made to the accompanying drawings that form a part hereof, and in which it is shown by way of illustration specific examples that can be practiced. It is to be understood that other examples can be used and structural changes can be made without departing from the scope of the disclosed examples.

Some vehicles, such as automobiles, may include various systems and sensors for estimating the vehicle's position and/or orientation. Autonomous vehicles can use such information for performing autonomous driving operations. However, the vehicle's position and orientation may not be determined with absolute certainty, which can pose serious risk to the vehicle and other property. Examples of the disclosure are directed to using the confidence level (e.g., the error bounds) of a vehicle's estimated position and orientation, a map, and zones for safe navigation. The error bounds can represent the area in which the vehicle determines that it is likely located. The vehicle's estimated location can be of a single point on the vehicle or of the entire vehicle so that the error bounds encompasses the entire vehicle. A smaller error bounds represents a higher confidence of the accuracy of the vehicle's estimated location. Conversely, a bigger error bounds represents a lower confidence of the accuracy of the vehicle's estimated location. Details of exemplary localization techniques are described in Ioannis M. Rekleitis, *A Particle Filter Tutorial for Mobile Robot Localization*, Tech. Rep. TR-CIM-04-02, Centre for Intelligent Machines, McGill University (2004), which is hereby incorporated by reference in its entirety for all purposes. The vehicle can determine within what zone(s) its error bounds is located by superimposing the error bounds with a map that is portioned into zones. The vehicle can use its estimated location error bounds to stay within a safe zone of the map. If the vehicle's estimated location error bounds enter a warning zone, the vehicle can redirect itself away from the warning zone and back into the safe zone. The vehicle can also use its estimated location error bounds to go into an emergency stop mode if it determines that its error bounds overlap with a stop zone. In this way, the vehicle can safely navigate within a map even without being able to determine the vehicle's location with absolute certainty.

Figure 1A:
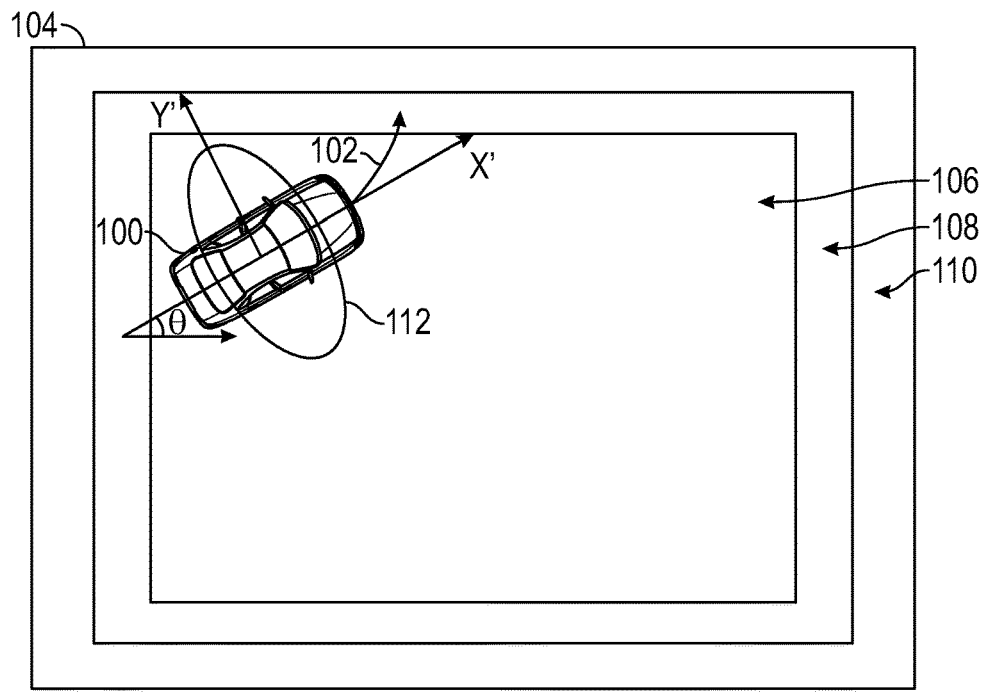
FIG. 1A illustrates an exemplary vehicle in the safe zone of a map according to examples of the disclosure.

FIG. 1A illustrates exemplary vehicle 100 autonomously navigating along driving path 102 on map 104 according to examples of the disclosure. Map 104 (not drawn to scale) can represent a parking lot, a driveway, a garage, a road with curbside parking, or any geographic location with designated areas for parking and/or driving. Map 104 can also represent a three-dimensional area such as a multi-level parking structure (or can represent any multi-dimensional area beyond the second dimension). Map 104 can be partitioned into various zones. For example, map 104 can be partitioned into safe zone 106, warning zone 108, and stop zone 110. Safe zone 106 (not drawn to scale) can represent the area in the map that the vehicle can freely and safely navigate around. Warning zone 108 can be any geographic area the vehicle should try to avoid. In some examples, warning zone 108 can serve as a buffer between safe zone 106 and stop zone 110 (e.g., the area between safe zone 106 and stop zone 110) so that vehicle 100 can avoid entering into stop zone 110. The size of warning zone 108 can vary depending on the size of map 104, the speed of vehicle 100, user preferences, or any other factors that will aid vehicle 100 from entering into stop zone 110. These zones can be predetermined, user generated, learned, crowed sourced, or determined by any other method for partitioning a map into zones. In some examples, the depth of warning zone 108 (e.g., the distance between safe zone 106 and stop zone 110) can range from a couple of feet or meters (e.g., two feet) to several feet or meters (e.g., five meters), and can vary at different areas of map 104. In some examples, the depth of warning zone 108 could be several meters if the vehicle 100 is traveling above a certain velocity. In other examples, warning zone 108 can be a couple of meters if vehicle 100 is traveling below a certain velocity. In some examples, warning zone 108 and stop zone 110 could be learned from the vehicle's lack of information (e.g., being unable to determine the vehicle's location within a particular area of a map). In some examples, warning zone 108 and stop zone 110 could be crowed-sourced from other vehicle's lack of information (e.g., many vehicles being unable to determine their location within a particular area of a map). In some examples, safe zone 106, warning zone 108, and stop zone 110 can be three-dimensional (or any dimension beyond the second dimension). Vehicle 100 can include various systems and sensors for estimating the vehicle's position (x', y') and orientation (Θ) within map 104. Vehicle 100 can also include various systems and sensors for estimating the vehicle's elevation along the Z' axis within a three-dimensional map (not shown). Vehicle 100 can also store the vehicle's location information over time for four-dimensional estimates (or can calculate any multi-dimensional estimate beyond the fourth dimension). The estimate of the vehicle's location can be represented by error bounds 112. The estimated vehicle location can be of a single point on the vehicle (as shown) or of the entire vehicle so that the error bounds encompasses the entire vehicle (not shown). The shape of error bounds 112 can represent the confidence level (or level of uncertainty) of the position estimate along the X' and Y' axes. The shape of error bounds 112 can also represent the confidence level of the vehicle's orientation, position along the Z' axis, or position over time (e.g., error bounds 112 can have any multi-dimensional shape beyond the second dimension). The systems and sensors for estimating the vehicle's location can include Global Positioning System (GPS) receivers, optical cameras, ultrasound sensors, radar sensors, LIDAR sensors, cellular positioning systems, maps, cloud services, and any other system or sensor that can be used to determine a vehicle's location. These systems and sensors can also help determine the location, size, and shape of safe zone(s) 106, warning zone(s) 108, and/or stop zone(s) 110. In some examples, a vehicle can include a plurality of cameras and/or sensors around the exterior of the vehicle to capture images or data of the vehicle's surroundings. These cameras and/or sensors can be positioned on the front, back, and sides of the vehicle to enable them to capture images and data within 360 degrees of the vehicle during a parking operation, for example. For example, the vehicle's cameras and/or sensors can detect a large lighting pole at the corner of a parking lot. The vehicle can use the location of the lighting pole (as detected by the cameras and/or sensors) to determine the location, size, and shape of stop zone 110 relative to the garbage bin (and/or its immediate vicinity). In some examples, the size and shape of stop zone 110 can be substantially the exact shape and size of the lighting pole or stop zone 110 can include the area immediately surrounding the lighting pole (e.g., within a few feet or meters from the lighting pole). The vehicle can also use the location of the lighting pole (and/or the location, size, and shape of stop zone 110) to determine the location, size, and shape of warning zone 108 surrounding stop zone 110.

Figure 1B:
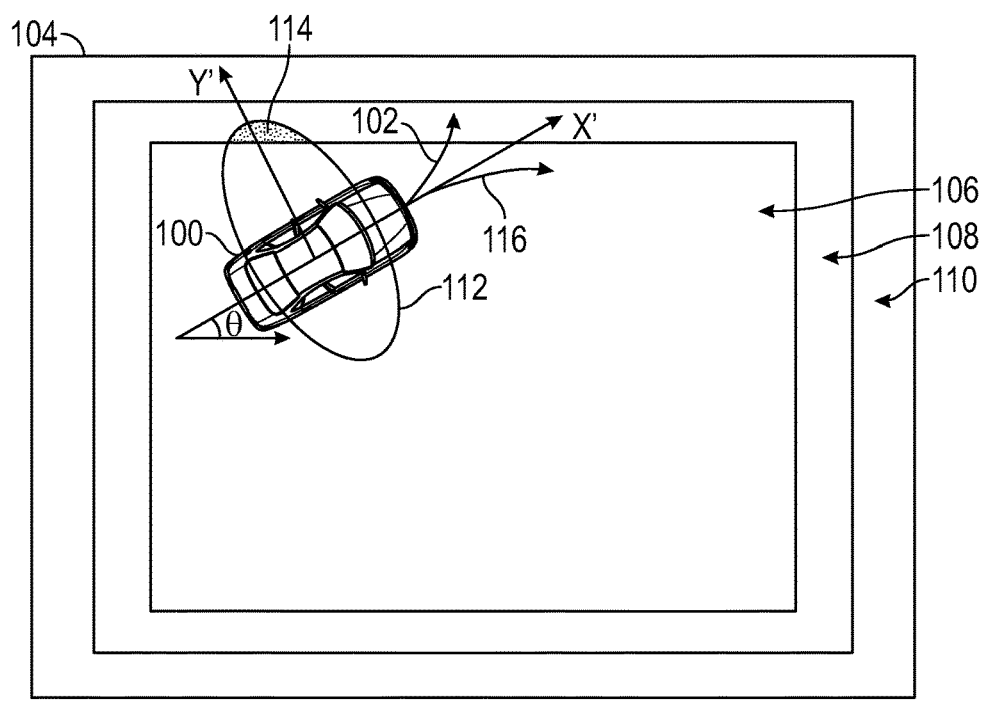
FIG. 1B illustrates an exemplary vehicle encroaching the warning zone of a map according to examples of the disclosure.

FIG. 1B illustrates exemplary vehicle 100 autonomously navigating along driving path 102 on map 104 at a subsequent point in time than in FIG. 1A according to examples of the disclosure. FIG. 1B illustrates error bounds 112 encroaching warning zone 108 at warning area 114. As a result of error bounds 112 overlapping with warning zone 108, vehicle 100 can redirect itself away from the warning area 114 along new driving path 116. The size and location of warning area 114 can be used to determine new driving path 116. For example, if warning area 114 is large relative to warning zone 108 (and/or error bounds 112) or is equal to or above a threshold (e.g., three or more square feet), new driving path 116 may require vehicle 100 to take a sharp turn away from warning zone 108. On the other hand, if warning area 114 is small relative to warning zone 108 (and/or error bounds 112) or is below a threshold (e.g., less than three square feet), new driving path 116 may require vehicle 100 to only slightly turn away from warning zone 108. Further, in some examples, the new driving path 116 can require vehicle 100 to reverse if the vehicle was driving forward and warning area 114 is in the forward facing direction of the vehicle. Conversely, the new driving path 116 can require vehicle 100 to drive forward if the vehicle was reversing and warning area 114 is in the backward facing direction of the vehicle. Further, the confidence level of error bounds 112 (e.g., its size and shape) can also be used to determine new driving path 116. For example, if error bounds is smaller than a threshold size (e.g., smaller than 70 square feet), new driving path 116 can require vehicle 100 to take a sharp turn away from warning zone 108, because the actual location of the vehicle can be relatively near warning zone 108. Redirecting vehicle 100 when it or error bounds 112 enters warning zone 108 can help vehicle 100 avoid driving into stop zone 110, which can represent a wall, a pool, a ditch, a mailbox, a lawn, a building, or any other area or structure that vehicle 100 should avoid. This can circumvent causing damage to the vehicle or other property.

Figure 1C:
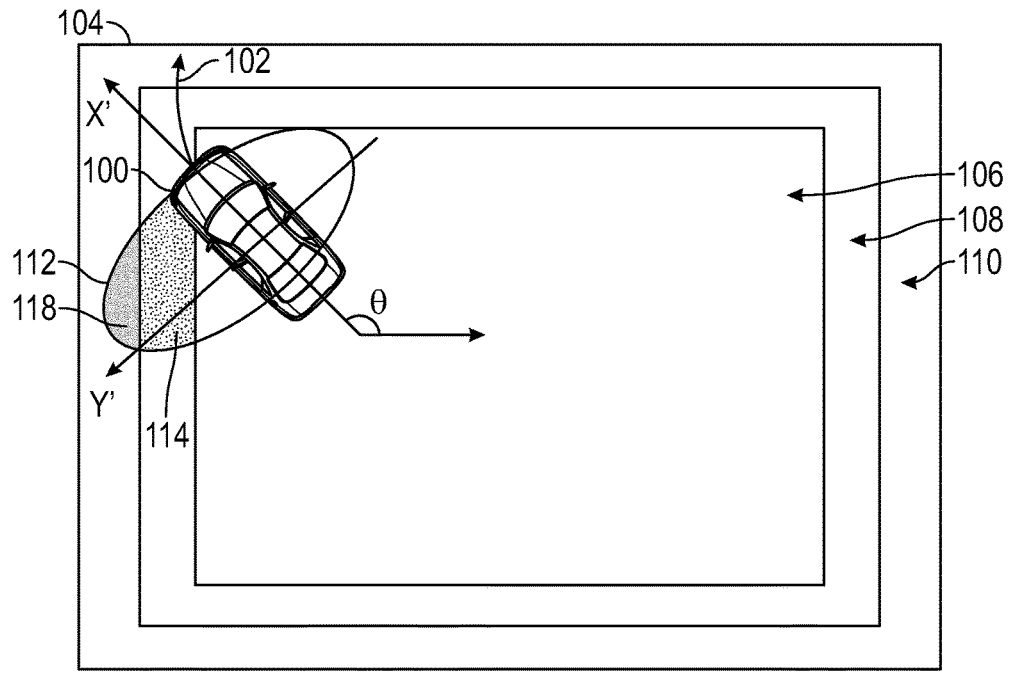
FIG. 1C illustrates an exemplary vehicle encroaching the stop zone and warning zone of a map according to examples of the disclosure.

FIG. 1C illustrates exemplary vehicle 100 autonomously navigating along a different driving path than in FIGS. 1A and 1B according to examples of the disclosure. FIG. 1C illustrates error bounds 112 encroaching warning zone 108 at warning area 114 and encroaching stop zone 110 at stop area 118. Stop area 118 can be an indication of a problem. For instance, stop area 118 may indicate that the vehicle collided with a structure (or is very close to doing so), fell into a ditch (or is very close to doing so), or that there is a severe problem with the vehicle's location systems or sensors. As a result of error bounds 112 and/or vehicle 100 entering the stop zone 110, the vehicle may go into an emergency stop mode as described in detail below.

Figure 2:
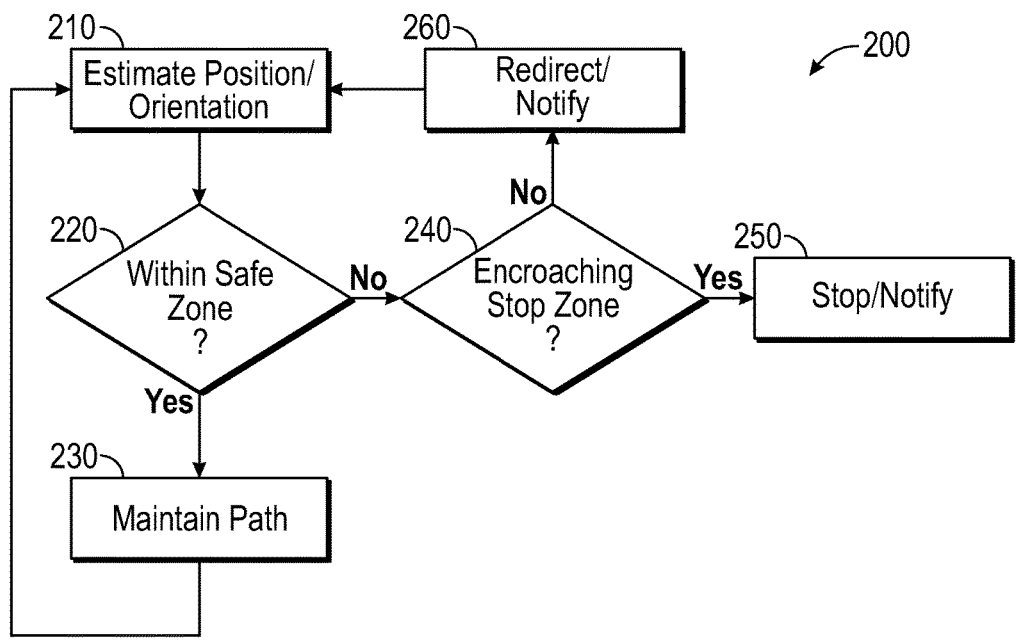
FIG. 2 illustrates an exemplary process for using a vehicle's estimated position and orientation for safe navigation according to examples of the disclosure.

FIG. 2 illustrates an exemplary process 200 for using a vehicle's position and orientation estimate for safe navigation according to examples of the disclosure. Process 200 can be performed continuously or repeatedly by the vehicle during automated driving procedures (e.g., automated parking procedures).

At step 210, the position and orientation of the vehicle can be estimated to determine error bounds 112 (e.g., as described above with references to FIGS. 1A-1C). As described above, the vehicle's location can be estimated with GPS receivers, optical cameras, ultrasound sensors, radar sensors, LIDAR sensors, cellular positioning systems, and any other systems or sensors that can be used to determine a vehicle's location. The information from these systems and sensors can include GPS data, camera data, sensor data, dead reckoning data, and any other location data that can be used as input to methods or techniques for calculating error bounds 112. In some examples, the gathered location data (in combination or independently) can be used as input for Kalman Filtering and Particle Filtering techniques to determine error bounds 112. As described above, vehicle 100 can be configured to calculate error bounds 112 from a single point of the vehicle or to calculate error bounds 112 to encompass the entire vehicle. In some examples, error bounds 112 can have a three-dimensional shape (or any multi-dimensional shape beyond the second dimension).

At step 220, the vehicle can determine if the vehicle is within a safe zone. Determining whether the vehicle is within a safe zone includes determining whether the vehicle's exterior parameters and the error bounds are all within a safe zone. In accordance with a determination that the vehicle is within a safe zone, the vehicle can maintain its current driving path (e.g., a driving path determined using any appropriate path determination techniques) at step 230, and process 200 can return to step 210. If the vehicle determines that it is not within a safe zone at step 220, the vehicle can determine whether it is encroaching a stop zone at step 240. Determining whether the vehicle is encroaching a stop zone includes determining whether any part of the vehicle's exterior parameters or the error bounds is within a stop zone. In accordance with a determination that the vehicle is encroaching a stop zone, the vehicle can automatically enter an emergency stop mode and stop moving at step 250. In some examples, the vehicle will only be taken out of emergency stop mode through third party intervention (e.g., manually take over driving operations, update map and/or zone information to reflect additional information about the location, size and/or shape of the zone(s) or the map), at which point, process 200 can end or return to step 210. In some examples, the vehicle can notify a designated third party that the vehicle entered a stop zone and/or activate visual and/or audio indicators during the emergency stop mode at step 250. The notification can be a phone call, text message, email, or any form of electronic or audible/visual communication to an electronic device associated with the third party (e.g., smartphone or other electronic device) or to another human being. The designated third party can be the vehicle's owner, the driver, a call center, a towing company, a 911 operator, and/or any other third party. Visual indicators can include one or more of a headlight, a hazard light, a smog light, or any light source on the outside or the inside of the vehicle. The audio indicators can include one or more of a horn, a speaker, an alarm system, and/or any other sound source in the vehicle. If the vehicle determines that it is not encroaching a stop zone at step 240, the vehicle can determine that it (and/or its error bounds) is encroaching a warning zone (e.g., as described above with references to FIGS. 1A-1C). In accordance with a determination that the vehicle is encroaching a warning zone, the vehicle can automatically redirect itself into a new driving path away from the warning zone at step 260 (e.g., as described above with references to FIGS. 1A-1C).

In some examples, the vehicle need not redirect itself into a new driving path if the vehicle is already moving away from the warning zone. The vehicle can determine if it is already moving away from the warning zone by storing information about the location, size, and/or shape of the vehicle's previous encroachments of the warning zone, and comparing that information to the current encroachment. For example, the vehicle can determine that its current encroachment of the warning zone is located in the back of the vehicle and has an area of about two square feet. The vehicle can compare that information to the stored information about the previous two encroachments, for example, which may have both been located in the back of the vehicle and had areas of four square feet and three square feet, respectively. The vehicle could thus deduce that it is moving away from the warning zone since the last three encroachments were all located in the back of the vehicle and were progressively becoming smaller. The vehicle can also use the stored information from previous encroachments of the warning zone to generate a new driving path. For example, the vehicle can determine an encroachment at the front left side of the vehicle and compare that information to the previous four encroachments, for example, which may have included encroachments in the front right side of the vehicle. The vehicle could use this information to determine that it is heading toward the corner of a warning zone and generate a new driving path that includes reversing away from the corner of the warning zone.

In some examples, the vehicle can notify a designated third party that the vehicle entered a warning zone and/or activate visual and/or audio indicators. The notification can be a phone call, text message, email, or any form of electronic communication to an electronic device associated with the third party (e.g., smartphone or other electronic device). The designated third party can be the vehicle's owner, the driver, and/or any other third party. Visual indicators can include one or more of a headlight, a hazard light, a smog light, or any light source on the outside or the inside of the vehicle. The audio indicators can include one or more of a horn, a speaker, an alarm system, and/or any other sound source in the vehicle. Once the vehicle redirects itself at step 260, process 200 can return to step 210.

Figure 3:
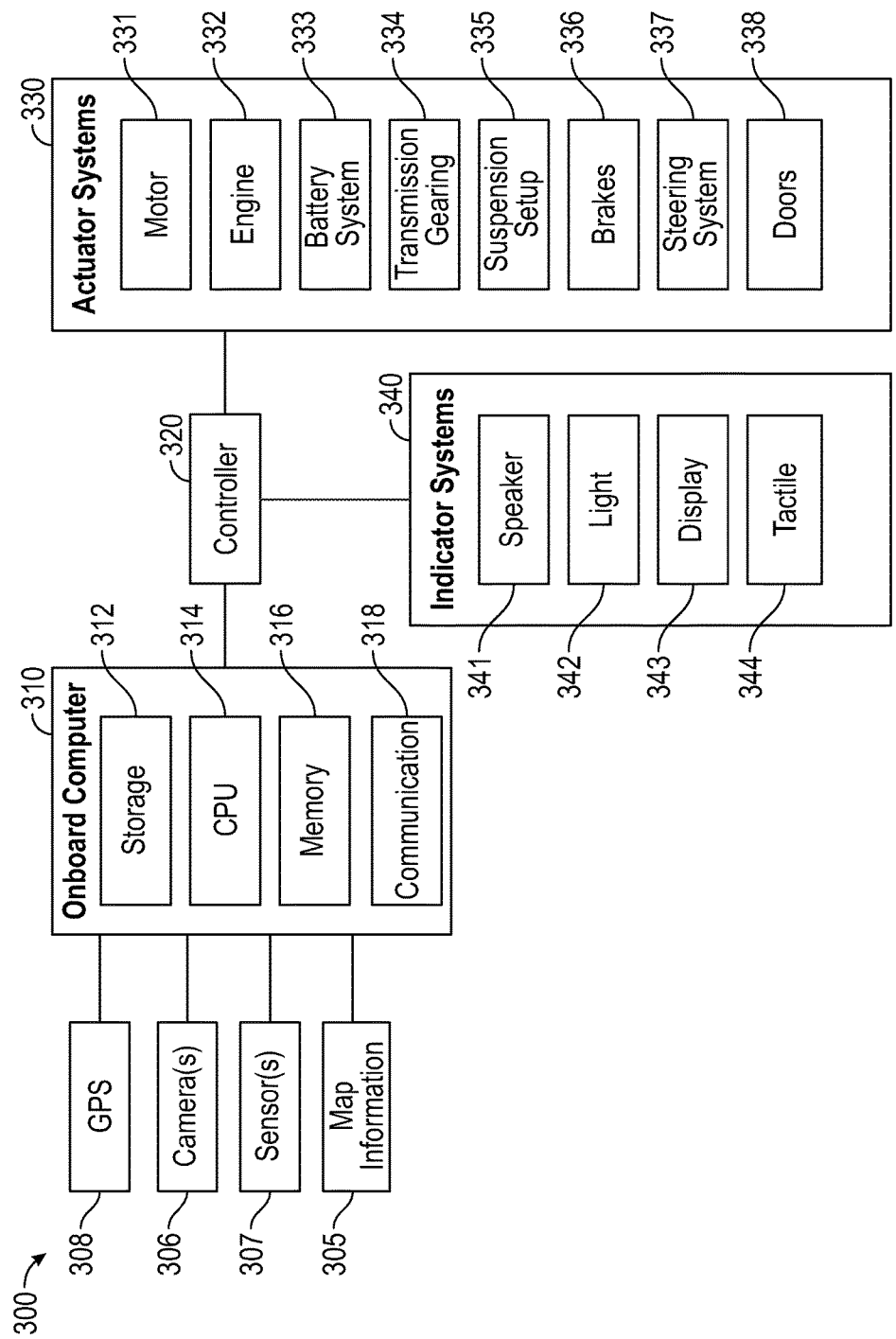
FIG. 3 illustrates an exemplary system block diagram of a vehicle control system according to examples of the disclosure.

FIG. 3 illustrates an exemplary system block diagram of vehicle control system 300 according to examples of the disclosure. Vehicle control system 300 can perform any of the methods described with reference to FIGS. 1A-1C and 2. System 300 can be incorporated into a vehicle, such as a consumer automobile. Other example vehicles that may incorporate the system 300 include, without limitation, airplanes, boats, or industrial automobiles. Vehicle control system 300 can include one or more cameras 306 capable of capturing image data (e.g., video data) for determining various characteristics of the vehicle's surroundings, as described with reference to FIGS. 1A-1C and 2. Vehicle control system 300 can also include one or more other sensors 307 (e.g., radar, ultrasonic, LIDAR, etc.) capable of detecting various characteristics of the vehicle's surroundings, and a Global Positioning System (GPS) receiver 308 capable of determining the location of the vehicle. The characteristics of the vehicle's surroundings can help determine the vehicle's position and orientation. The characteristics of the vehicle's surroundings can also help determine area maps and zones (e.g., as described above with references to FIGS. 1A-1C and 2). Vehicle control system 300 can also receive (e.g., via an internet connection) map information and/or zone information via a map information interface 305 (e.g., a cellular internet interface, a Wi-Fi internet interface, etc.).

Vehicle control system 300 can include an on-board computer 310 that is coupled to the cameras 306, sensors 307, GPS receiver 308, and map information interface 305, and that is capable of receiving the image data from the cameras and/or outputs from the sensors 307, the GPS receiver 308, and map information interface 305. The on-board computer 310 can be capable of determining the error bounds, maps, safe zones, warning zones, and stop zones, and how to navigate the vehicle safely within a map, as described in this disclosure. On-board computer 310 can include storage 312, memory 316, communications interface 318, and a processor 314. Processor 314 can perform any of the methods described with reference to FIGS. 1A-1C and 2. Additionally, communications interface 318 can perform any of the communication notifications described with reference to FIGS. 1A-1C and 2. Moreover, storage 312 and/or memory 316 can store data and instructions for performing any of the methods described with reference to FIGS. 1A-1C and 2. Storage 312 and/or memory 316 can be any non-transitory computer readable storage medium, such as a solid-state drive or a hard disk drive, among other possibilities. The vehicle control system 300 can also include a controller 320 capable of controlling one or more aspects of vehicle operation, such as performing autonomous parking or driving operations using the error bounds, maps, and zones determined by the on-board computer 310.

In some examples, the vehicle control system 300 can be connected to (e.g., via controller 320) one or more actuator systems 330 in the vehicle and one or more indicator systems 340 in the vehicle. The one or more actuator systems 330 can include, but are not limited to, a motor 331 or engine 332, battery system 333, transmission gearing 334, suspension setup 335, brakes 336, steering system 337 and door system 338. The vehicle control system 300 can control, via controller 320, one or more of these actuator systems 330 during vehicle operation; for example, to control the vehicle during autonomous driving or parking operations, which can utilize the error bounds, map, and zones determined by the on-board computer 310, using the motor 331 or engine 332, battery system 333, transmission gearing 334, suspension setup 335, brakes 336 and/or steering system 337, etc. Actuator systems 330 can also include sensors that send dead reckoning information (e.g., steering information, speed information, etc.) to on-board computer 310 (e.g., via controller 320) to estimate the vehicle's position and orientation. The one or more indicator systems 340 can include, but are not limited to, one or more speakers 341 in the vehicle (e.g., as part of an entertainment system in the vehicle), one or more lights 342 in the vehicle, one or more displays 343 in the vehicle (e.g., as part of a control or entertainment system in the vehicle) and one or more tactile actuators 344 in the vehicle (e.g., as part of a steering wheel or seat in the vehicle). The vehicle control system 300 can control, via controller 320, one or more of these indicator systems 340 to provide visual and/or audio indications that the vehicle entered into a warning zone or a stop zone using the vehicle's error bounds determined by the on-board computer 310.

Thus, the examples of the disclosure provide various ways to utilize a vehicle's position and orientation estimate (e.g., error bounds) to safely navigate the vehicle autonomously.

Therefore, according to the above, some examples of the disclosure are directed to a system comprising: one or more sensors; one or more processors coupled to the one or more sensors; and a memory including instructions, which when executed by the one or more processors, cause the one or more processors to perform a method comprising: receiving information about a map comprising one or more zones; and while navigating a vehicle along a driving path within the map: receiving, via the one or more sensors, information about a location of the vehicle in the map; estimating an error bounds of the location of the vehicle in the map; determining in which of the one or more zones in the map the error bounds is located within; and in response to the determination: in accordance with a determination that the error bounds is located within a first zone of the one or more zones in the map, performing a first driving operation; and in accordance with a determination that the error bounds is located within a second zone, and not within the first zone, of the one or more zones in the map, performing a second driving operation, different from the first driving operation. Additionally or alternatively to one or more of the examples disclosed above, in some examples, the one or more zones in the map includes a safe zone and a warning zone; the first zone is the warning zone; the first driving operation comprises determining a new driving path, wherein the new driving path navigates the vehicle away from the warning zone and toward the safe zone; the second zone is the safe zone; and the second driving operation comprises the vehicle maintaining the driving path. Additionally or alternatively to one or more of the examples disclosed above, in some examples, determining that the error bounds is located within the first zone comprises determining that a partial area of the error bounds is located within the first zone. Additionally or alternatively to one or more of the examples disclosed above, in some examples, the partial area of the error bounds is equal to or above a threshold, and the new driving path includes a sharp turn away from the warning zone. Additionally or alternatively to one or more of the examples disclosed above, in some examples, the partial area of the error bounds is below the threshold, and the new driving path includes a slight turn away from the warning zone. Additionally or alternatively to one or more of the examples disclosed above, in some examples, the vehicle is navigating in a forward direction along the driving path within the map; the partial area of the error bounds is in a front facing direction of the vehicle; and the new driving path includes reversing away from the warning zone and toward the safe zone. Additionally or alternatively to one or more of the examples disclosed above, in some examples, the vehicle is navigating in a backward direction along the driving path within the map; the partial area of the error bounds is in a backward facing direction of the vehicle; and the new driving path includes driving forward away from the warning zone and toward the safe zone. Additionally or alternatively to one or more of the examples disclosed above, in some examples, the vehicle is navigating in a backward direction along the driving path within the map; the partial area of the error bounds is in a backward facing direction of the vehicle; and the new driving path includes driving forward away from the warning zone and toward the safe zone. Additionally or alternatively to one or more of the examples disclosed above, in some examples, the error bounds is smaller than a threshold size, and the new driving path includes a sharp turn away from the warning zone. Additionally or alternatively to one or more of the examples disclosed above, in some examples, first driving operation further comprises notifying a third party. Additionally or alternatively to one or more of the examples disclosed above, in some examples, the one or more zones in the map includes a safe zone and a stop zone; the first zone is the stop zone; the first driving operation comprises the vehicle entering into an emergency stop mode; the second zone is the safe zone; and the second driving operation comprises the vehicle maintaining the driving path. Additionally or alternatively to one or more of the examples disclosed above, in some examples, the emergency stop mode comprises stopping the vehicle. Additionally or alternatively to one or more of the examples disclosed above, in some examples, the emergency stop mode further comprises activating an indicator in the vehicle. Additionally or alternatively to one or more of the examples disclosed above, in some examples, the indicator is one or more of a headlight, a hazard light, a smog light, a horn, a speaker, and an alarm system in the vehicle. Additionally or alternatively to one or more of the examples disclosed above, in some examples, the emergency stop mode further comprises notifying a third party. Additionally or alternatively to one or more of the examples disclosed above, in some examples, the location of the vehicle in the map comprises the vehicle's position and orientation in the map. Additionally or alternatively to one or more of the examples disclosed above, in some examples, the information about the location of the vehicle in the map comprises one or more of GPS information, sensor information, camera information, and dead reckoning information from the vehicle. Additionally or alternatively to one or more of the examples disclosed above, in some examples, the driving path is part of an automated parking procedure.

Some examples of the disclosure are directed to a non-transitory computer-readable medium including instructions, which when executed by one or more processors, cause the one or more processors to perform a method comprising: receiving information about a map comprising one or more zones; and while navigating a vehicle along a driving path within the map: receiving, via one or more sensors, information about a location of the vehicle in the map; estimating an error bounds of the location of the vehicle in the map; determining in which of the one or more zones in the map the error bounds is located within; and in response to the determination: in accordance with a determination that the error bounds is located within a first zone of the one or more zones in the map, performing a first driving operation; and in accordance with a determination that the error bounds is located within a second zone, and not within the first zone, of the one or more zones in the map, performing a second driving operation, different from the first driving operation.

Some examples of the disclosure are directed to a vehicle comprising: one or more sensors; one or more processors; and a memory including instructions, which when executed by the one or more processors, cause the one or more processors to perform a method comprising: receiving information about a map comprising one or more zones; and while navigating a vehicle along a driving path within the map: receiving, via the one or more sensors, information about a location of the vehicle in the map; estimating an error bounds of the location of the vehicle in the map; determining in which of the one or more zones in the map the error bounds is located within; and in response to the determination: in accordance with a determination that the error bounds is located within a first zone of the one or more zones in the map, performing a first driving operation; and in accordance with a determination that the error bounds is located within a second zone, and not within the first zone, of the one or more zones in the map, performing a second driving operation, different from the first driving operation.

Some examples of the disclosure are directed to a method comprising: receiving information about a map comprising one or more zones; and while navigating a vehicle along a driving path within the map: receiving information about a location of the vehicle in the map; estimating an error bounds of the location of the vehicle in the map; determining in which of the one or more zones in the map the error bounds is located within; and in response to the determination: in accordance with a determination that the error bounds is located within a first zone of the one or more zones in the map, performing a first driving operation; and in accordance with a determination that the error bounds is located within a second zone, and not within the first zone, of the one or more zones in the map, performing a second driving operation, different from the first driving operation.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A system comprising:
one or more sensors;
one or more processors coupled to the one or more sensors; and
a memory including instructions, which when executed by the one or more processors, cause the one or more processors to perform a method comprising:
receiving information about a map comprising one or more zones; and
while navigating a vehicle along a driving path within the map:
receiving, via the one or more sensors, information about a location of the vehicle in the map;
estimating an error bounds of the location of the vehicle in the map;
determining in which of the one or more zones in the map the error bounds is located within; and
in response to the determination:
in accordance with a determination that the error bounds is located within a first zone of the one or more zones in the map, performing a first driving operation; and
in accordance with a determination that the error bounds is located within a second zone, and not within the first zone, of the one or more zones in the map, performing a second driving operation, different from the first driving operation.

2. The system of claim 1, wherein:
the one or more zones in the map includes a safe zone and a warning zone;
the first zone is the warning zone;
the first driving operation comprises determining a new driving path, wherein the new driving path navigates the vehicle away from the warning zone and toward the safe zone;
the second zone is the safe zone; and
the second driving operation comprises the vehicle maintaining the driving path.

3. The system of claim 2, wherein the first driving operation further comprises notifying a third party.

4. The system of claim 1, wherein:
determining that the error bounds is located within the first zone comprises determining that a partial area of the error bounds is located within the first zone.

5. The system of claim 4, wherein the partial area of the error bounds is equal to or above a threshold, and the new driving path includes a sharp turn away from the warning zone.

6. The system of claim 5, wherein the partial area of the error bounds is below the threshold, and the new driving path includes a slight turn away from the warning zone.

7. The system of claim 4, wherein:
the vehicle is navigating in a forward direction along the driving path within the map;
the partial area of the error bounds is in a front facing direction of the vehicle; and
the new driving path includes reversing away from the warning zone and toward the safe zone.

8. The system of claim 4, wherein:
the vehicle is navigating in a backward direction along the driving path within the map;
the partial area of the error bounds is in a backward facing direction of the vehicle; and
the new driving path includes driving forward away from the warning zone and toward the safe zone.

9. The system of claim 4, wherein:
the vehicle is navigating in a backward direction along the driving path within the map;
the partial area of the error bounds is in a backward facing direction of the vehicle; and
the new driving path includes driving forward away from the warning zone and toward the safe zone.

10. The system of claim 4, wherein the error bounds is smaller than a threshold size, and the new driving path includes a sharp turn away from the warning zone.

11. The system of claim 1, wherein:
the one or more zones in the map includes a safe zone and a stop zone;
the first zone is the stop zone;
the first driving operation comprises the vehicle entering into an emergency stop mode;
the second zone is the safe zone; and
the second driving operation comprises the vehicle maintaining the driving path.

12. The system of claim 11, wherein the emergency stop mode comprises stopping the vehicle.

13. The system of claim 12, wherein the emergency stop mode further comprises activating an indicator in the vehicle.

14. The system of claim 13, wherein the indicator is one or more of a headlight, a hazard light, a smog light, a horn, a speaker, and an alarm system in the vehicle.

15. The system of claim 11, wherein the emergency stop mode further comprises notifying a third party.

16. The system of claim 1, wherein the location of the vehicle in the map comprises the vehicle's position and orientation in the map.

17. The system of claim 1, wherein the information about the location of the vehicle in the map comprises one or more of GPS information, sensor information, camera information, and dead reckoning information from the vehicle.

18. The system of claim 1, wherein the driving path is part of an automated parking procedure.

19. A non-transitory computer-readable medium including instructions, which when executed by one or more processors, cause the one or more processors to perform a method comprising:
receiving information about a map comprising one or more zones; and
while navigating a vehicle along a driving path within the map:
receiving, via one or more sensors, information about a location of the vehicle in the map;
estimating an error bounds of the location of the vehicle in the map;
determining in which of the one or more zones in the map the error bounds is located within; and
in response to the determination:
in accordance with a determination that the error bounds is located within a first zone of the one or more zones in the map, performing a first driving operation; and
in accordance with a determination that the error bounds is located within a second zone, and not within the first zone, of the one or more zones in the map, performing a second driving operation, different from the first driving operation.

20. A vehicle comprising:
one or more sensors;
one or more processors; and
a memory including instructions, which when executed by the one or more processors, cause the one or more processors to perform a method comprising:
receiving information about a map comprising one or more zones; and
while navigating a vehicle along a driving path within the map:
receiving, via the one or more sensors, information about a location of the vehicle in the map;
estimating an error bounds of the location of the vehicle in the map;
determining in which of the one or more zones in the map the error bounds is located within; and
in response to the determination:
in accordance with a determination that the error bounds is located within a first zone of the one or more zones in the map, performing a first driving operation; and
in accordance with a determination that the error bounds is located within a second zone, and not within the first zone, of the one or more zones in the map, performing a second driving operation, different from the first driving operation.

* * * * *